US012573823B2

(12) United States Patent
Johnson

(10) Patent No.: US 12,573,823 B2
(45) Date of Patent: Mar. 10, 2026

(54) CABLE TRAY ASSEMBLY WITH SPLICE PLATE ASSEMBLY AND BONDING JUMPER

(71) Applicant: Eaton Intelligent Power Limited, Dublin (IE)

(72) Inventor: Jacob Lee Johnson, New Baden, IL (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 257 days.

(21) Appl. No.: 18/155,257

(22) Filed: Jan. 17, 2023

(65) Prior Publication Data

US 2023/0231368 A1 Jul. 20, 2023

Related U.S. Application Data

(60) Provisional application No. 63/301,393, filed on Jan. 20, 2022.

(51) Int. Cl.
H02G 3/06 (2006.01)
H02G 3/04 (2006.01)

(52) U.S. Cl.
CPC ......... H02G 3/0608 (2013.01); H02G 3/0437 (2013.01); H02G 3/0456 (2013.01)

(58) Field of Classification Search
CPC ... H02G 3/0456; H02G 3/0437; H02G 3/0608
See application file for complete search history.

(56) References Cited

U.S. PATENT DOCUMENTS

| | | | | |
|---|---|---|---|---|
| 3,042,351 A * | 7/1962 | Marvin | H02G 3/0437 | |
| | | | 248/49 | |
| 2008/0199140 A1* | 8/2008 | Beck | G02B 6/4459 | |
| | | | 385/136 | |
| 2008/0264688 A1* | 10/2008 | Chopp | H02G 3/263 | |
| | | | 174/503 | |
| 2019/0356120 A1* | 11/2019 | McAdoo | H02G 1/00 | |
| 2020/0021092 A1* | 1/2020 | Johnson | F16L 3/26 | |
| 2020/0366071 A1* | 11/2020 | Khalkar | H02G 3/0437 | |

* cited by examiner

*Primary Examiner* — Steven T Sawyer
(74) *Attorney, Agent, or Firm* — Stinson LLP

(57) ABSTRACT

A cable tray assembly includes first and second cable tray sections each including a base and rails extending transversely from longitudinal sides of the base. A splice plate assembly is configured to engage the first and second cable tray sections for attaching the first cable tray section to the second cable tray section. A bonding jumper is attached to the splice plate assembly such that a first end of the bonding jumper is attached to a first splice plate and a second end of the bonding jumper is attached to a second splice plate whereby the bonding jumper is attached to the cable tray sections without forming holes in the cable tray sections. The splice plate assembly and bonding jumper providing an electrically conductive link between the cable tray sections.

17 Claims, 4 Drawing Sheets

CABLE TRAY ASSEMBLY WITH SPLICE PLATE ASSEMBLY AND BONDING JUMPER

CROSS-REFERENCE TO RELATED APPLICATION

This application claims the benefit of U.S. Provisional Application No. 63/301,393, filed Jan. 20, 2022, the entirety of which is hereby incorporated by reference.

FIELD OF THE DISCLOSURE

The present disclosure generally relates to cable tray assemblies, and more particularly to cable tray assemblies including cable trays, splice plates, and bonding jumpers.

BACKGROUND OF THE DISCLOSURE

Cable trays are used by industry to support electrical cable. In one design, a length or section of cable tray comprises a pair of side walls and a bottom wall. The side walls and bottom wall may be formed from sheet metal, and may be integrally formed. Multiple cable tray sections can be coupled or spliced together, end-to-end, to form a cable tray assembly, also known as a cable tray run. Typically, the side walls of adjacent cable tray sections are spliced together using cable tray splices. These cable tray splices may include a plate and bolts for fastening the plate to the adjacent side walls of the adjacent cable tray sections.

Long runs of cable trays require expansion joints to be inserted into the run at set intervals to allow the trays to expand and contract from changes in temperature. However, the tray run must maintain electrically continuality across the entire run. Conventional expansion splices leave a discontinuous gap in the tray run. Therefore, a bonding jumper is installed between cable tray sections to provide an electrical bridge between adjacent cable sections. These bonding jumpers may require holes to be drilled into the side of the cable tray sections to bolt the bonding jumpers to the cable tray.

SUMMARY

In one aspect, a cable tray assembly generally comprises first and second cable tray sections each including a base and rails extending transversely from longitudinal sides of the base. A splice plate assembly is configured to engage the first and second cable tray sections for attaching the first cable tray section to the second cable tray section. The splice plate assembly comprises a first splice plate secured to the first cable tray section and a second splice plate coupled to the first splice plate and secured to the second cable tray section. A bonding jumper is attached to the splice plate assembly such that a first end of the bonding jumper is attached to the first splice plate and a second end of the bonding jumper is attached to the second splice plate whereby the bonding jumper is attached to the cable tray sections without forming holes in the cable tray sections. The splice plate assembly and bonding jumper providing an electrically conductive link between the cable tray sections.

In another aspect, a splice plate assembly for use in attaching cable tray sections together to form a cable tray assembly generally comprises a first splice plate configured to be secured to a first cable tray section. The first splice plate includes a planar base and a tab extending transversely from the planar base. A second splice plate is coupled to the first splice plate and configured to be secured to a second cable tray section to attach the second cable tray section to the first cable tray section. The second splice plate includes a planar base and a tab extending transversely from the planar base of the second splice plate. Each tab defines a fastener hole for attaching to ends of a bonding jumper to provide an electrically conductive link between the splice plates.

BRIEF DESCRIPTION OF THE DRAWINGS

Corresponding reference characters indicate corresponding parts throughout the drawings.

DETAILED DESCRIPTION OF THE DISCLOSURE

Figure 1:
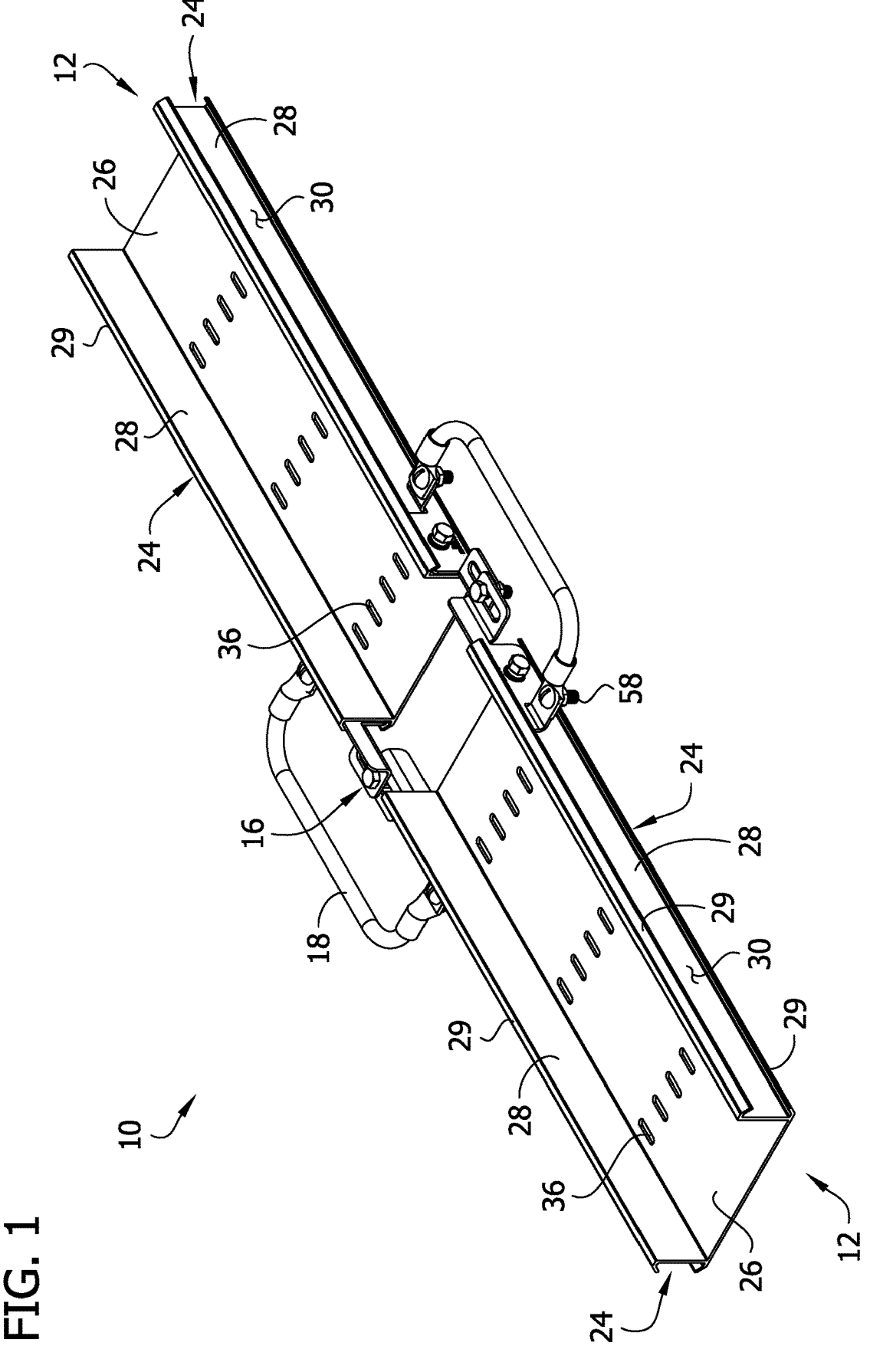
FIG. 1 is a perspective of a cable tray assembly including cable tray sections, splice plate assemblies, and bonding jumpers.
Figure 2:
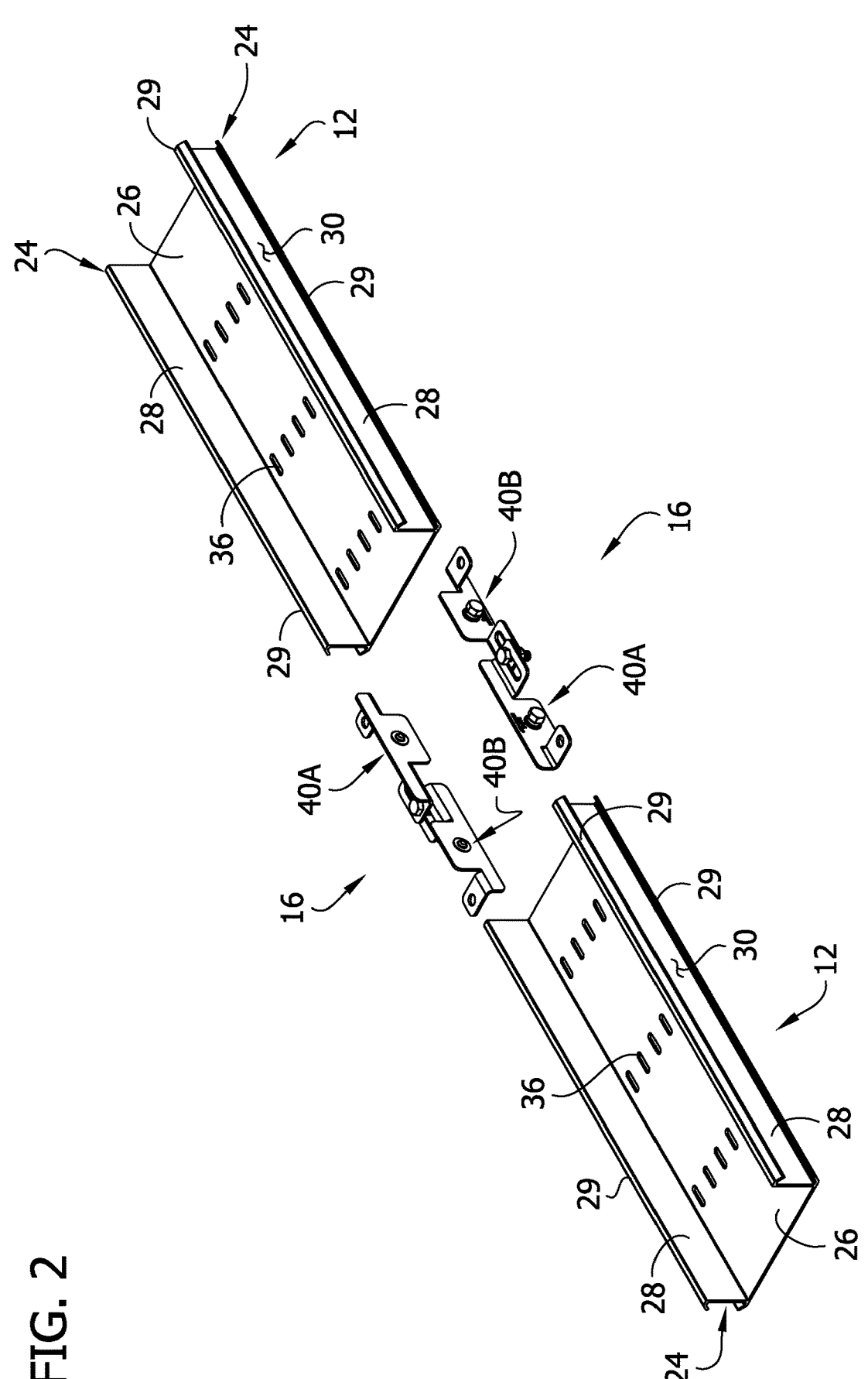
FIG. 2 is an exploded view of the cable tray assembly in FIG. 1 with the bonding jumpers removed.

Referring now to the drawings, and in particular to FIG. 1, a cable tray assembly constructed according to the teachings of the present disclosure is generally indicated at reference numeral 10. The cable tray assembly includes cable tray sections, generally indicated at 12 (two are shown in the illustrated embodiment), splice plate assemblies, generally indicated at 16, and bonding jumpers 18 attached to the splice plate assemblies and configured to reliably establish an electrical connection between adjacent cable tray sections 12. In the illustrated embodiment, two bonding jumpers 18 are attached to opposite sides of the cable tray sections 12 at a juncture between the two cable tray sections. As used herein, terms denoting relative locations and positions of components and structures, including but not limited to "upper," "lower," "left," "right," "front," and "rear," are in reference to the cable tray assembly 10 in a horizontal orientation. It is understood that these terms are used for ease of description and not meant in a limiting sense. It is understood that the cable tray assembly 10 may be in a vertical orientation in the field, whereby the relative locations and positions of the components and structures would be different than as shown in the drawings. As used herein, the term "inboard" means toward or in the interior of the cable tray sections 12 and/or cable tray assembly 10. As used herein, the term "outboard" means away from the interior or at the exterior of the cable tray sections 12 and/or cable tray assembly 10.

Each cable tray section 12 includes two parallel rails, generally indicated at 24, forming the sides of the cable tray sections, and a web or base 26 extending between the rails 24. In the illustrated embodiment, each rail 24 has a "dovetail" configuration. In particular, each rail 24 includes a planar vertical section 28 and a pair of flanges 29 (broadly, a retainer) extending along a length the vertical section. The flanges 29 extend outwardly (i.e., in an outboard direction) from top and bottom edges of the vertical section 28. In the illustrated embodiment, the flanges 29 on the top edge of the vertical section 28 extend downward at an angle, and the flanges on the bottom edge of the vertical section extend upward at an angle forming a dovetail shaped channel 30 on an exterior or outboard side of the rail. It will be understood that the flanges 29 could have other shapes and configurations without departing from the scope of the disclosure.

The rails 24 and base 26 of each cable tray section 12 may be formed integrally such that the rails and base are formed from a single blank of material. However, the rails 24 and base 26 could be formed separately and attached together by suitable means. Pre-formed holes 36 (e.g., square, rectangular, oblong shaped openings) are defined by the base 26 and spaced apart across the base. In the illustrated embodiment, the holes 36 are arranged in rows that are spaced apart longitudinally along the base 26. The holes 36 in each row are aligned longitudinally along the base 26, and each row is uniformly spaced from the adjacent row. However, the holes 36 may be located in other positions without departing from the scope of the disclosure. The length of each manufactured cable tray section 12 may also vary (e.g., from 10-30 feet). In one embodiment, the cable tray sections 12 may be cut to fit in the field to varying lengths as desired for their specific use.

Figure 3:
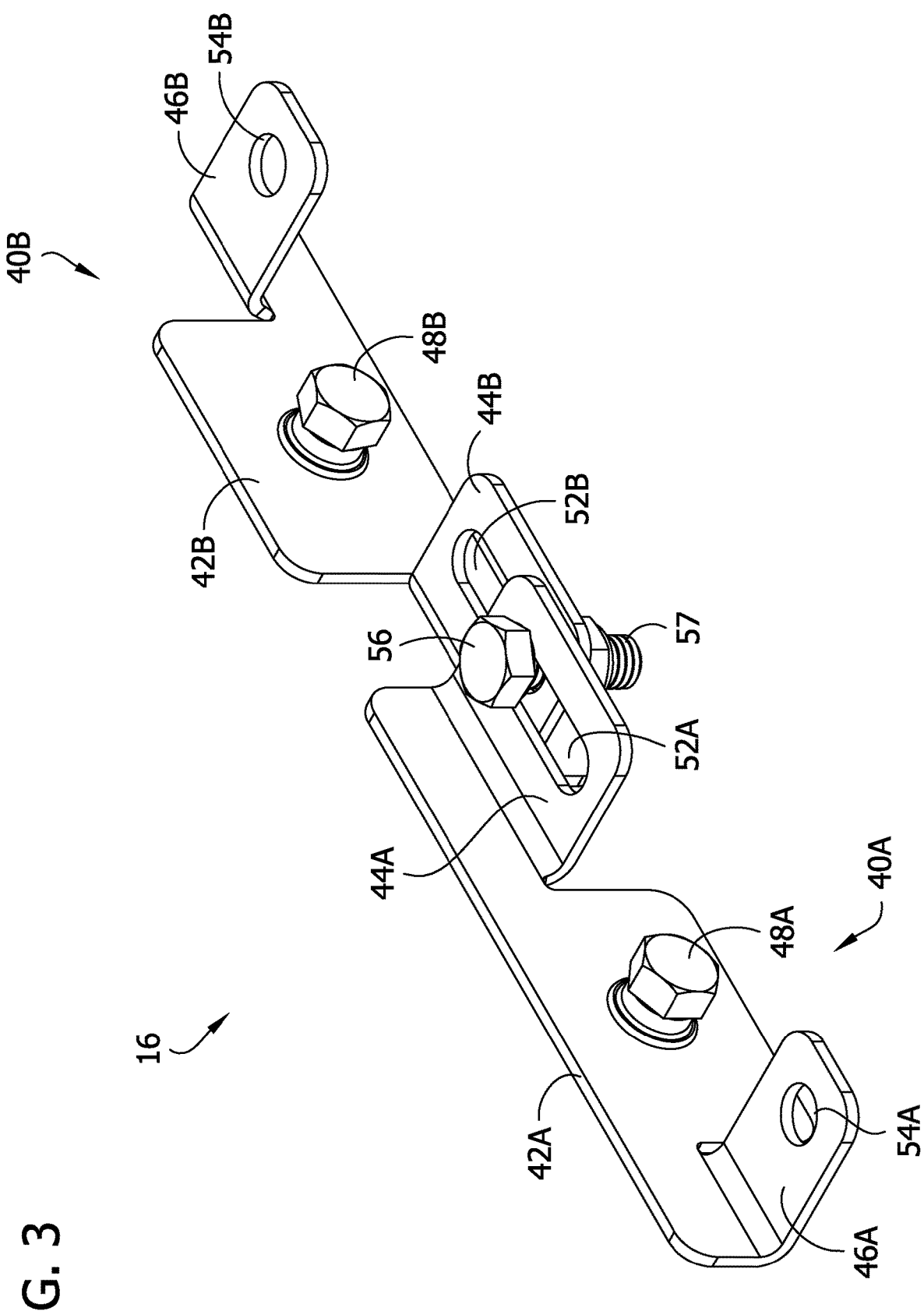
FIG. 3 is a front perspective of a splice plate assembly of the cable tray assembly.
Figure 4:
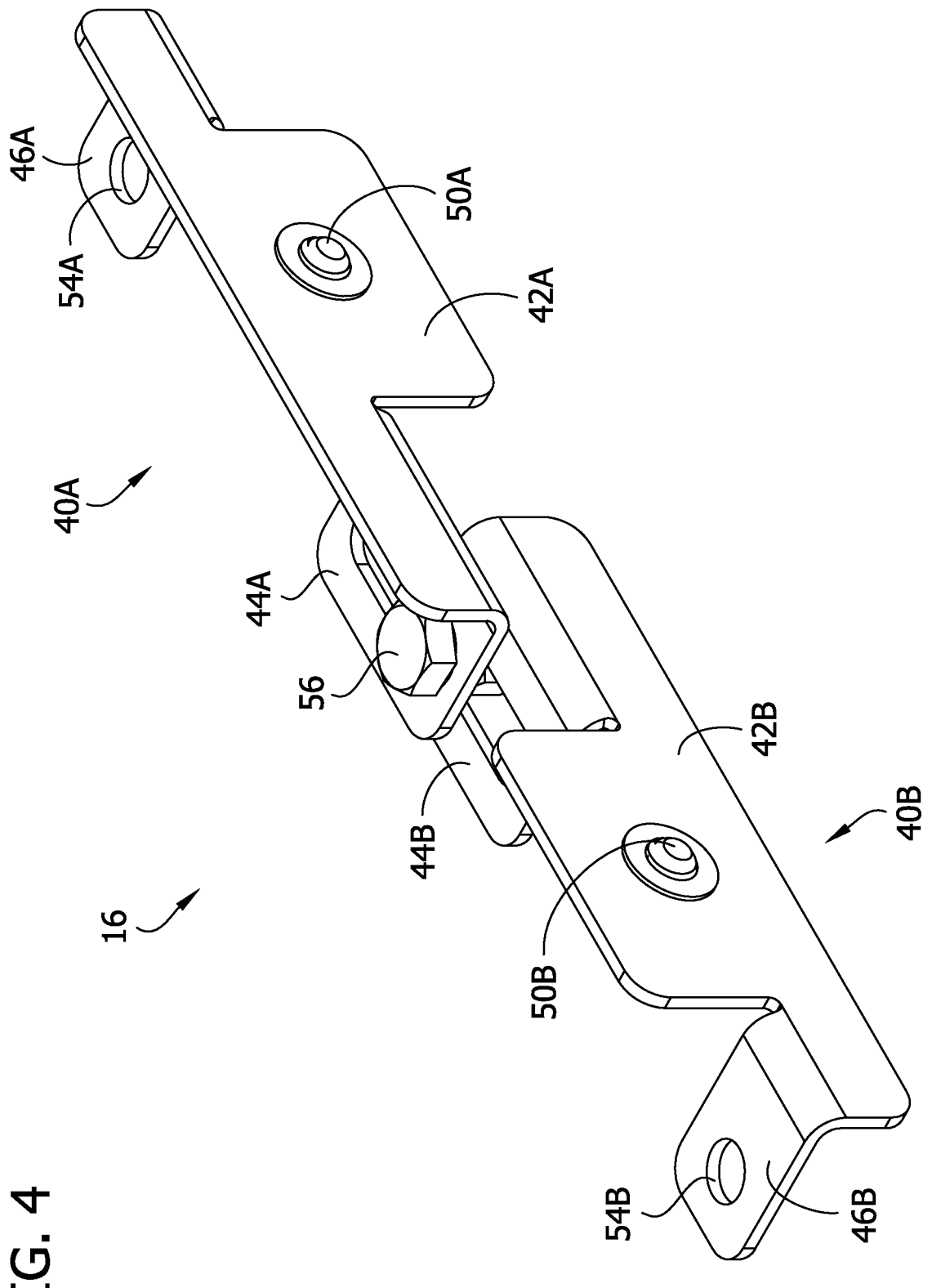
FIG. 4 is rear perspective of the splice plate assembly.

Referring to FIGS. 1, 3, and 4, the splice plate assemblies 16 comprise a first splice plate 40A engageable with a first cable tray section 12 and a second splice plate 40B engageable with a second cable tray section 12 to connect the second cable tray section to the first cable tray section. The splice plates 40A, 40B are receivable in the dovetail shaped channels 30 of the cable tray sections 12 to at least temporarily retain the splice plates to the cable tray sections. The first splice plate 40A comprises a planar base 42A, a first tab 44A extending transversely from the planar base, and a second tab 46A, separate from the first tab, extending transversely from the planar base. The planar base 42A includes an interior surface configured to contact or oppose the base 26 of the rail 24 of the first cable tray section 12, and an exterior surface facing away from the base of the rail. A connector 48A is mounted to the planar base 42A and extends from the exterior surface, through the planar base, to the interior surface of the planar base. An attachment formation 50A (FIG. 4) is formed on the interior surface of the planar base 42A and extends around a connector opening (not shown). In the illustrated embodiment, the attachment formation 50A is integrally formed with the planar base 42A. However, the attachment formation 50A could be formed separately from the planar base 42A and suitably attached. In one embodiment, the connector 48A comprises a set screw and the attachment formation 50A comprises a threaded channel (e.g., revit nut). A head of the set screw 48A may be seated on the exterior surface of the planar base 42A and a shaft of the set screw may extend through the planar base and the attachment formation 50A for engagement with the base 26 of the rail to secure the first splice plate 40A to the first cable tray section 12, as will be explained in greater detail below. In one embodiment, the connector opening is a pre-formed fastener hole (e.g., round or circular shaped openings) defined by the planar base 42A of the first splice plate 40A for receiving the connector 48A to secure the first splice plate to the cable tray sections 12.

As shown in FIGS. 3 and 4, the tabs 44A, 46A extend transversely (e.g., orthogonally) from the planar base 42A in an outboard direction. In the illustrated embodiment, the first tab 44A is disposed generally at a first end of the planar base 42A and the second tab 46A is disposed generally at a second end of the planar base, opposite the first end. However, it will be understood that the tabs 44A, 46A could be located at other positions on the planar base 42A without departing from the scope of the disclosure. The first tab 44A defines a slot 52A, and the second tab 46B defines a fastener hole 54A. In the illustrated embodiment, the slot 52A comprises an elongate opening extending along a majority of the length of the first tab 44A. The fastener hole 54A in the second tab 46A is shown as a circular opening. The openings 52A, 54A facilitate connection of the first splice plate 40A with complementary structure of the splice plate assembly 16, as will be explained in greater detail below. In the illustrated embodiment, the tabs 44A, 46A comprises material bent from the planar base section 42A. However, the tabs 44A, 46A could be formed separately from the planar base section 42A and suitably attached. Still other means of connecting the tabs 44A, 46A to the planar base section 42A are envisioned without departing from the scope of the disclosure. In the illustrated embodiment, the tabs 44A, 46A are separate and distinct from each other. However, the tabs 44A, 46A may comprise a single tab or two or more tabs joined together or extending from each other without departing from the scope of the disclosure. In one embodiment, the first splice plate 40A is formed from metal. The first splice plate 40A may have other configurations without departing from the scope of the disclosure.

The second splice plate 40B has a similar configuration to the first splice plate 40A. Accordingly, the second splice plate 40B comprises a planar base 42B, a first tab 44B extending transversely from the planar base, and a second tab 46B, separate from the first tab, extending transversely from the planar base. The planar base 42B includes an interior surface configured to contact or oppose the base 26 of the rail 24 of the second cable tray section 12, and an exterior surface facing away from the base of the rail. A connector 48B is mounted to the planar base 42B and extends from the exterior surface, through the planar base, to the interior surface of the planar base. An attachment formation 50B (FIG. 4) is formed on the interior surface of the planar base 42B and extends around a connector opening (not shown). In the illustrated embodiment, the attachment formation 50B is integrally formed with the planar base 42B. However, the attachment formation 50B could be formed separately from the planar base 42B and suitably attached. In one embodiment, the connector 48B comprises a set screw and the attachment formation 50B comprises a threaded channel (e.g., revit nut). A head of the set screw 48B may be seated on the exterior surface of the planar base 42B and a shaft of the set screw may extend through the planar base and the attachment formation 50B for engagement with the base 26 of the rail to secure the second splice plate 40B to the second cable tray section 12, as will be explained in greater detail below. In one embodiment, the connector opening is a pre-formed fastener hole (e.g., round or circular shaped openings) defined by the planar base 42B of the second splice plate 40B for receiving the connector 48B to secure the second splice plate 40B to the cable tray sections 12.

As shown in FIGS. 3 and 4, the tabs 44B, 46B of the second splice plate 40B extend transversely (e.g., orthogonally) from the planar base 42B in an outboard direction. In the illustrated embodiment, the first tab 44B is disposed generally at a first end of the planar base 42B and the second tab 46B is disposed generally at a second end of the planar base, opposite the first end. However, it will be understood that the tabs 44B, 46B could be located at other positions on the planar base 42B without departing from the scope of the disclosure. The first tab 44B defines a slot 52B, and the second tab 46B defines a fastener hole 54B. In the illustrated embodiment, the slot 52B comprises an elongate opening extending along a majority of the length of the first tab 44B. The fastener hole 54B in the second tab 46B is shown as a circular opening. The openings 52B, 54B facilitate connection of the second splice plate 40B with complementary structure of the splice plate assembly 16, as will be explained in greater detail below. In the illustrated embodiment, the tabs 44B, 46B comprises material bent from the planar base section 42B. However, the tabs 44B, 46B could be formed separately from the planar base section 42B and suitably attached. Still other means of connecting the tabs 44B, 46B to the planar base section 42B are envisioned without departing from the scope of the disclosure. In the illustrated embodiment, the tabs 44B, 46B are separate and distinct from each other. However, the tabs 44B, 46B may comprise a single tab or two or more tabs joined together or extending from each other without departing from the scope of the disclosure. In one embodiment, the second splice plate 40B is formed from metal. The second splice plate 40B may have other configurations without departing from the scope of the disclosure.

The splice place assembly 16 is constructed by movably coupling the second splice plate 40A to the first splice plate 40B. In one embodiment, this is accomplished by placing the first tab 44A of the first splice plate 40B over the first tab 44B of the second splice plate 40B such that at least a portion of the slots 52A, 52B in the tabs are aligned. Alternatively, the first tab 44B of the second splice plate 40B can be placed over the first tab 44A of the first splice plate 40A. A fastener 56 is then received through the slots 52A, 52B in the tabs 44A, 44B thereby moveably coupling the splice plates 40A, 40B. In one embodiment, the fastener 56 comprises a screw configured to be received in a nut 57 to capture the tabs 44A, 44B between a head of the screw and the nut. The screw 56 and nut 57 are configured to be loosened to allow relative movement in at least one direction (e.g., a longitudinal direction) of the splice plates 40A, 40B, and tightened to prevent relative movement in the at least one direction. The splice plate assembly 16 may be configured in a first state where the fastener 56 is loosened such that the splice plates 40A, 40B are movably coupled together prior to installation on the cable tray sections 12, and in a second state where the fastener is tightened to prevent relative movement between the splice plates after the splice plate assembly is installed on the cable tray sections. It will be understood, however, that the splice plates 40A, 40B can be configured in the second state prior to being installed on the cable tray sections 12 without departing from the scope of the disclosure.

To connect the splice plate assembly 16 to the cable tray sections 12, the first splice plate 40A may be slid into the open channel 30 of the first cable tray sections 12, and the second splice plate 40B may be slide into the open channel 30 of the second cable tray section 12 thereby temporarily securing the splice plates to their respective cable tray sections. The cable tray sections 12 may then be brought together such that longitudinal ends of the cable tray sections are adjacent to but spaced apart from each other. In one embodiment, the cable tray sections are spaced apart by at least the length of the first tabs 44A, 44B of the splice plates 40A, 40B. However, other spacings are envisioned without departing from the scope of the disclosure. In this position, the connector 48A on the first splice plate 40A will be in registration with the exterior surface of the base 26 of the first cable tray section 12, and the connector 48B on the second splice plate 40B will be in registration with the exterior surface of the base 26 of the second cable tray section 12. The connectors 48A, 48B can then be operated (e.g., rotated) to press against the exterior surfaces of the bases 26 of the cable tray sections 12 to secure the splice plates 40A, 40B in position in the channels 30. Thus, the splice plates 40A, 40B, and particularly the connectors 48A, 48B, facilitate attachment of the cable tray sections 12 together without the use of an additional tool (e.g., screwdriver, wrench, drill, etc.) as is required by thread-type fasteners (i.e., bolts, screws, etc.). Therefore, in one embodiment, the splice plates 40A, 40B are attached to the rails of the cable tray sections 12 without forming drill holes in the planar vertical sections 28 of the rails 24.

The splice plate assembly 16 also provides for attachment or coupling of additional components to the cable tray assembly 10. For example, the second tabs 46B on the splice plates 40A, 40B provide connection locations for attaching the bonding jumpers 18 to the splice plate assembly 16. In the illustrated embodiment, fasteners 58 (e.g., screw fasteners) are received in the fastener holes 54A, 54B in the second tabs 46A, 46B and attach ends of the bonding jumpers 18 to the tabs (FIG. 1). Therefore, a first end of the bonding jumper 18 is attached to the first splice plate 40A and a second end of the bonding jumper is attached to the second splice plate 40B. The attachment of the bonding jumpers 18 through the second tabs 46A, 46B on the splice plates 40A, 40B also ensures that attachment of the bonding jumpers to the cable tray sections 12 can be performed without forming drill holes in the cable tray sections.

Additionally, the fasteners 58 may be formed from metal such that a conductive path is established between the first cable tray section 12 and the second cable tray section 12 through the splice place assembly 16 and bonding jumper 18. In one embodiment, a conductive path between the first cable tray 12 and the bonding jumper 18 extends from the planar vertical section 28 of the first cable tray section, to the connector 48A on the first splice plate 40A, along the planar base 42A of the first splice plate, to the second tab 46A of the first splice plate, and to a junction between the second tab, the fastener 58 on the second tab, and the first end of the bonding jumper 18. The conducting path, likewise, extends in the reverse order from the second end of the bonding jumper 18 to the planar vertical section 28 of the second cable tray section 12. Thus, a continuous electrical path is established between the cable tray sections 12 from the first splice plate 40A, through the bonding jumpers 18, to the second splice plate 40B. Therefore, the attachment of the splice plate assembly 16 to the cable tray sections 12 does not cause a break in the conductive path between the cable tray sections.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A splice plate assembly for use in attaching cable tray sections together to form a cable tray assembly, the splice plate assembly comprising:

a first splice plate configured to be secured to a first cable tray section, the first splice plate including a planar base and a tab extending transversely from the planar base;

a first connector on the first splice plate for securing the first splice plate to the first cable tray section;

a second splice plate coupled to the first splice plate and configured to be secured to a second cable tray section to attach the second cable tray section to the first cable tray section, the second splice plate including a planar base, a tab extending transversely from the planar base of the second splice plate, each tab defining a fastener hole for attaching to ends of a bonding jumper to provide an electrically conductive link between the splice plates; and a second connector on the second splice plate for securing the second splice plate to the second cable tray section, wherein the first and second connectors each comprises a set screw for engaging an exterior surface of the rails to secure the splice plates to the cable tray sections without forming a hole through the cable tray sections.

2. The assembly set forth in claim 1, wherein the electrically conductive link has a conductive path established between the cable tray sections that extends from the first cable tray section, to the first connector, to the first splice plate, to the bonding jumper, to the second splice plate, to the second connector, to the second cable tray section.

3. The assembly set forth in claim 1, wherein the splice plates each include a second tab extending transversely from the planar base, the splice plates being coupled together at the second tabs.

4. The assembly set forth in claim 1, in combination with a bonding jumper, the assembly further comprising fasteners attaching the ends of the bonding jumper to the tabs.

5. The assembly set forth in claim 1, wherein the splice plates each include a connector formation configured to engage a respective connector for retaining the connector to the splice plate.

6. The assembly set forth in claim 3, further comprising a fastener attached to the second tabs for coupling the splice plates together.

7. The assembly set forth in claim 6, wherein the fastener movably couples the splice plates together such that the first splice plate is moveable relative to the second splice plate in at least one direction in a first configuration.

8. The assembly set forth in claim 7, wherein the fastener fixedly couples the first splice plate to the second splice plate such that the first splice plate is prevented from movement in the at least one direction in a second configuration.

9. A splice plate system for use in attaching cable tray sections together to form a cable tray assembly, the splice plate system comprising:

a first splice plate comprising:

a planar base having an interior surface and an exterior surface opposite the interior surface; a first tab extending transversely from the planar base outwardly from the exterior surface; and a second tab extending transversely from the planar base outwardly from the exterior surface, wherein the first tab and the second tab are longitudinally spaced apart along the planar base, and wherein the first tab is configured to extend longitudinally between the cable tray sections when the cable tray is longitudinally aligned; and a second splice plate comprising: a planar base having an interior surface and an exterior surface opposite the interior surface; and a first tab extending transversely from the planar base outwardly from the exterior surface; and a second tab extending transversely from the planar base outwardly from the exterior surface, wherein the first tab of the first splice plate overlaps the first tab of the second splice plate.

10. The splice plate system set forth in claim 9, wherein the first tab of the first splice plate defines a slot extending longitudinally.

11. The splice plate system set forth in claim 9, wherein the second tab of the first splice plate defines a hole.

12. The splice plate system set forth in claim 10, further comprising a fastener received through the slot.

13. A cable tray assembly, comprising:

a first cable tray section including a base and rails extending transversely from longitudinal sides of the base;

a second cable tray section including a base and rails extending transversely from longitudinal sides of the base, wherein the second cable tray section is positioned adjacent the first cable tray section;

a first splice plate coupled to first cable tray section having an interior surface facing the first cable tray section and an exterior surface opposite the interior surface and including at least first and second two tabs extending transversely from the exterior surface; and a second splice plate coupled to second first cable tray section having an interior surface facing the second cable tray section and an exterior surface opposite the interior surface and including at least first and second two tabs extending transversely from the exterior surface, wherein the first tabs of a first tab of the at least two tabs of the respective first and second splice plates at least partially overlap and are coupled to one another.

14. The cable tray assembly of claim 13, further comprising a bonding jumper coupled to and interconnecting the second tabs of the first and second splice plates.

15. The cable tray assembly of claim 13, wherein each of the first tabs of the first splice plate and the second splice plate define a slot extending longitudinally.

16. The splice plate set forth in claim 15, further including a fastener extending through the slots of the first tabs of the first and second splice plates to couple the first tabs to one another.

17. The cable tray assembly of claim 15, wherein the slots of first tabs at least partially overlap one another.

* * * * *